US012505392B2

(12) United States Patent
Yoshizawa et al.

(10) Patent No.: US 12,505,392 B2
(45) Date of Patent: Dec. 23, 2025

(54) WORK ASSIGNMENT STATUS MONITORING SYSTEM, WORK ASSIGNMENT STATUS MONITORING METHOD, AND WORK ASSIGNMENT STATUS MONITORING PROGRAM

(71) Applicant: TOYOTA JIDOSHA KABUSHIKI KAISHA, Toyota (JP)

(72) Inventors: Shintaro Yoshizawa, Nagoya (JP); Takayuki Kanai, Toyota (JP); Kazuhiro Shintani, Toyokawa (JP); Hideki Kajima, Toyota (JP); Masayoshi Tsuchinaga, Nisshin (JP); Yuto Mori, Toyota (JP); Hisataka Yuasa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 17/973,704

(22) Filed: Oct. 26, 2022

(65) Prior Publication Data
US 2023/0133242 A1 May 4, 2023

(30) Foreign Application Priority Data

Oct. 28, 2021 (JP) ................. 2021-176252

(51) Int. Cl.
*G06Q 10/0631* (2023.01)
(52) U.S. Cl.
CPC .......... *G06Q 10/063114* (2013.01); *G06Q 10/063116* (2013.01)
(58) Field of Classification Search
None
See application file for complete search history.

(56) References Cited

U.S. PATENT DOCUMENTS 9,781,494 B1 10/2017 Barakat et al.
10,882,185 B2 * 1/2021 Vu ..................... G01S 17/89
(Continued)

FOREIGN PATENT DOCUMENTS

JP 2007-323199 A 12/2007
JP 2011-034234 A 2/2011
JP 2019-101919 A 6/2019

OTHER PUBLICATIONS

Amick III, Benjamin C., and Michael J. Smith. "Stress, computer-based work monitoring and measurement systems: A conceptual overview." Applied Ergonomics 23.1 (1992): 6-16 (Year: 1992).*

(Continued)

*Primary Examiner* — Darlene Garcia-Guerra
(74) *Attorney, Agent, or Firm* — Dinsmore & Shohl LLP

(57) ABSTRACT

A work assignment status monitoring system includes an acquisition unit configured to acquire information about one or more work areas, a monitoring target detection unit configured to detect a monitoring target and define a first monitoring target area where the monitoring target is positioned, a first determination unit configured to determine whether or not the monitoring target has performed a work assignment in the one or more work areas based on a presence or absence of interference with the one or more work areas by the first monitoring target area, an information generation unit configured to generate information about the work assignment in the one or more work areas performed by the monitoring target based on a result of the determination made by the first determination unit, and an output unit configured to output information about the work assignment performed by the monitoring target.

14 Claims, 15 Drawing Sheets

(56) References Cited

U.S. PATENT DOCUMENTS

| | | | | |
|---|---|---|---|---|
| 11,124,401 | B1* | 9/2021 | Jarvis | G05D 1/0225 |
| 2005/0234592 | A1* | 10/2005 | McGee | G05D 1/027 |
| | | | | 700/245 |
| 2009/0055270 | A1* | 2/2009 | Magdon-Ismail | G06F 16/957 |
| | | | | 705/14.27 |
| 2010/0287011 | A1* | 11/2010 | Muchkaev | A63F 13/792 |
| | | | | 706/45 |
| 2014/0278645 | A1 | 9/2014 | Davidson et al. | |
| 2014/0350708 | A1* | 11/2014 | Kobayashi | G06Q 10/06 |
| | | | | 700/108 |
| 2016/0118085 | A1* | 4/2016 | Ptitsyn | G11B 27/32 |
| | | | | 386/241 |
| 2018/0053141 | A1* | 2/2018 | Shydo, Jr. | G05D 1/104 |
| 2018/0200888 | A1* | 7/2018 | Kim | G05D 1/0246 |
| 2019/0034855 | A1* | 1/2019 | Halioris | G06Q 10/08 |
| 2019/0057340 | A1* | 2/2019 | Wang | G06Q 10/109 |
| 2019/0266031 | A1* | 8/2019 | Wu | H04L 67/55 |
| 2019/0275671 | A1* | 9/2019 | Natarajan | B25J 9/1664 |
| 2020/0192337 | A1* | 6/2020 | Hoffman | G05B 19/41865 |
| 2020/0202472 | A1* | 6/2020 | Barak | H04W 4/021 |
| 2021/0223779 | A1* | 7/2021 | Passot | G01C 21/20 |
| 2021/0245956 | A1* | 8/2021 | Douglas | B65G 1/1375 |
| 2022/0033186 | A1* | 2/2022 | Nilsen | G05D 1/0297 |
| 2022/0258342 | A1* | 8/2022 | Gildert | B25J 9/1661 |
| 2024/0043213 | A1* | 2/2024 | Jarvis | G05D 1/0285 |

OTHER PUBLICATIONS

Dieber, Bernhard, Christian Micheloni, and Bernhard Rinner. "Resource-aware coverage and task assignment in visual sensor networks." IEEE Transactions on Circuits and Systems for Video Technology 21.10 (2011): 1424-1437 (Year: 2011).*

Luo, Xiaochun, et al. "Towards efficient and objective work sampling: Recognizing workers' activities in site surveillance videos with two-stream convolutional networks." Automation in Construction 94 (2018): 360-370 (Year: 2018).*

Draganjac, Ivica, et al. "Decentralized control of multi-AGV systems in autonomous warehousing applications." IEEE Transactions on Automation Science and Engineering 13.4 (2016): 1433-1447 (Year: 2016).*

* cited by examiner

WORK ASSIGNMENT STATUS MONITORING SYSTEM, WORK ASSIGNMENT STATUS MONITORING METHOD, AND WORK ASSIGNMENT STATUS MONITORING PROGRAM

CROSS REFERENCE TO RELATED APPLICATIONS

This application is based upon and claims the benefit of priority from Japanese patent application No. 2021-176252, filed on Oct. 28, 2021, the disclosure of which is incorporated herein in its entirety by reference.

BACKGROUND

The present disclosure relates to a work assignment status monitoring system, a work assignment status monitoring method, and a work assignment status monitoring program.

In recent years, it has been required to efficiently monitor a work assignment status(es) of one or more designated work assignments performed by a worker.

A production management apparatus disclosed in Japanese Unexamined Patent Application Publication No. 2007-323199 includes a worker detection apparatus, a worker identification unit, a movement pattern identification unit, and an abnormal movement detection unit. The worker identification unit identifies, from detection information received from the worker detection apparatus, a start time for detecting a presence of a worker and an end time thereof in a process which corresponds to the detection information. A movement pattern identification unit identifies a stay time indicating a period of time for which the worker has engaged in the process and generates a movement pattern including the period of stayed time. The abnormal movement detection unit uses, as one of conditions for determining whether or not an abnormal movement pattern has occurred, a result of a comparison between a period of stayed time included in information about the movement pattern and a period of stayed time included in information about a standard movement pattern.

SUMMARY

The present disclosure is not limited to the method disclosed in Japanese Unexamined Patent Application Publication No. 2007-323199, and there is a need to continuously and efficiently monitor a work assignment status(es) of one or more designated work assignments performed by a target to be monitored such as a worker or the like. The target to be monitored will be hereinafter referred to as a monitoring target.

An object of the present disclosure is to provide a work assignment status monitoring system, a work assignment status monitoring method, and a work assignment status monitoring program capable of inferring a work assignment status(es) of one or more designated work assignments being performed by a monitoring target such as a worker or the like with a small amount of information and efficiently monitoring the work assignment status.

In an example aspect of the present disclosure, a work assignment status monitoring system includes: an acquisition unit configured to acquire information about one or more work areas; a monitoring target detection unit configured to detect either a worker or a predetermined mobile body as a monitoring target and define a first monitoring target area where the monitoring target is positioned; a first determination unit configured to determine whether or not the monitoring target has performed a work in the one or more work areas based on a presence or absence of interference with the one or more work areas by the first monitoring target area; an information generation unit configured to generate information about the work in the one or more work areas performed by the monitoring target based on a result of the determination made by the first determination unit; and an output unit configured to output information about the work assignment performed by the monitoring target generated by the information generation unit. This work assignment status monitoring system determines whether the monitoring target has performed the work assignment(s) in one or more work areas based on the presence or absence of interference with the one or more work areas by the first monitoring target area where the monitoring target such as the worker is positioned. It is thus possible to infer and monitor the work assignment status of the monitoring target with a smaller amount of information than that in the case where, for example, the movement of the monitoring target is analyzed in detail. That is, this work assignment status monitoring system can efficiently monitor the work assignment status(es) of one or more designated work assignments performed by the monitoring target such as the worker.

The first determination unit may be configured to determine that the monitoring target has performed the work in the work area when a period of time of the interference with the work area by the first monitoring target area in each of the work areas is more than or equal to a reference time set in the work area.

The information about the work assignment performed by the monitoring target in the one or more work areas may include information about a start time, a work time, and an end time of the work assignment performed by the monitoring target in each of the work areas.

The one or more work areas may include an area where another mobile body other than the predetermined mobile body, which is the monitoring target, is positioned.

The monitoring target detection unit may be configured to further detect a predetermined part of the monitoring target and define a second monitoring target area where the predetermined part is positioned.

The monitoring target detection unit may be configured to detect the monitoring target using either a distance measurement sensor or a camera.

The work assignment status monitoring system may further include: a recording unit configured to record, as a plurality of work assignment histories, a plurality of pieces of information generated by the information generation unit and related to the work assignment performed by the monitoring target; and a normal state decision unit configured to decide a normal state for the work assignment performed by the monitoring target from the plurality of work assignment histories recorded in the recording unit. The output unit may be further configured to output new information about the work assignment performed by the monitoring target generated by the information generation unit, together with a result of a comparison between the new information about the work assignment performed by the monitoring target generated by the information generation unit and information about the work assignment in the normal state. Thus, the work assignment status monitoring system can set the normal state of the work assignment order, the work time, and the like for each of the monitoring targets. It is thus possible to present whether or not the normal state for the worker who is the monitoring target is the normal state for the worker who is the monitoring target, for example, even when the work time of a certain work assignment performed by the worker who is the monitoring target is longer than those of other workers due to differences in experience and skill.

The output unit may be configured to output the new information about the work assignment performed by the monitoring target in a highlighted manner in accordance with a degree of deviation from the information about the work assignment in the normal state.

The work assignment status monitoring system may further include a second determination unit configured to determine whether or not the new information about the work assignment performed by the monitoring target is included in a range of the normal state based on the degree of deviation of the new information about the work assignment performed by the monitoring target from the information about the work assignment performed in the normal state. The output unit may be configured to further output a result of the determination made by the second determination unit.

The work assignment status monitoring system may further include: a recording unit configured to record, as a plurality of work assignment histories, a plurality of pieces of information generated by the information generation unit and related to the work assignment performed by the monitoring target; a normal state decision unit configured to decide a normal state for the work assignment performed by the monitoring target from the plurality of work assignment histories recorded in the recording unit; and a prediction unit configured to predict information about a work exceeding the range of the normal state among the plurality of pieces of the information about the work assignments performed by the monitoring target generated next by the information generation unit based on the degree of deviation of the plurality of pieces of information about the work assignments performed by the monitoring target recorded as the plurality of work assignment histories in the recording unit from information about the work assignment in the normal state. The output unit may be further configured to output a result of the prediction made by the prediction unit. In this manner, since the work assignment status monitoring system can predict the work that may exceed the range of the normal state for each monitoring target, for example, a warning can be given in advance to the worker who is the monitoring target.

In another example aspect of the present disclosure, a work assignment status monitoring method includes: an acquisition step of acquiring information about one or more work areas; a monitoring target detection step of detecting either a worker or a predetermined mobile body as a monitoring target and define a first monitoring target area where the monitoring target is positioned; a determination step of determining whether or not the monitoring target has performed a work in the one or more work areas based on a presence or absence of interference with the one or more work areas by the first monitoring target area; an information generation step of generating information about the work in the one or more work areas performed by the monitoring target based on a result of the determination made in the determination step; and a first output step of outputting information about the work assignment performed by the monitoring target generated in the information generation step. This work assignment status monitoring system determines whether the monitoring target has performed the work assignment(s) in one or more work areas based on the presence or absence of interference with the one or more work areas by the first monitoring target area where the monitoring target such as the worker is positioned. It is thus possible to infer and monitor the work assignment status of the monitoring target with a smaller amount of information than that in the case where, for example, the movement of the monitoring target is analyzed in detail. This work assignment status monitoring method determines whether the monitoring target has performed the work assignment(s) in one or more work areas based on the presence or absence of interference with the one or more work areas by the first monitoring target area where the monitoring target such as the worker is positioned. It is thus possible to infer and monitor the work assignment status of the monitoring target with a smaller amount of information than that in the case where, for example, the movement of the monitoring target is analyzed in detail. That is, this work assignment status monitoring method can efficiently monitor the work assignment status(es) of one or more designated work assignments performed by the monitoring target such as the worker.

The work assignment status monitoring method may further include: a recording step of recording, as a plurality of work assignment histories, a plurality of pieces of information generated in the information generation step and related to the work assignment performed by the monitoring target; a normal state decision step of deciding a normal state for the work assignment performed by the monitoring target from the plurality of work assignment histories recorded in the recording step; and a second output step of outputting new information about the work assignment performed by the monitoring target generated in the information generation step, together with a result of a comparison between the new information about the work assignment performed by the monitoring target generated in the information generation step and the information about the work assignment in the normal state. Thus, the work assignment status monitoring method can set the normal state of the work assignment order, the work time, and the like for each of the monitoring targets. It is thus possible to present whether or not the normal state for the worker who is the monitoring target is the normal state for the worker who is the monitoring target, for example, even when the work time of a certain work assignment performed by the worker who is the monitoring target is longer than those of other workers due to differences in experience and skill.

The work assignment status monitoring method may further include: a recording step of recording, as a plurality of work assignment histories, a plurality of pieces of information generated in the information generation step and related to the work assignment performed by the monitoring target; a normal state decision step of deciding a normal state for the work assignment performed by the monitoring target from the plurality of recorded work assignment histories recorded in the recording step; a prediction step of predicting information about a work exceeding the range of the normal state among the plurality of pieces of the information about the work assignments performed by the monitoring target generated next in the information generation step based on the degree of deviation of the plurality of pieces of information about the work assignments performed by the monitoring target recorded as the plurality of recorded work assignment histories from information about the work assignment in the normal state; and a second output step of outputting a result of the prediction. In this manner, since the work assignment status monitoring method can predict the work that may exceed the range of the normal state for each monitoring target, for example, a warning can be given in advance to the worker who is the monitoring target.

In another example aspect of the present disclosure, a work assignment status monitoring program includes: acquisition processing of acquiring information about one or more work areas; monitoring target detection processing of detecting either a worker or a predetermined mobile body as a monitoring target and define a first monitoring target area where the monitoring target is positioned; determination processing of determining whether or not the monitoring target has performed a work in the one or more work areas based on a presence or absence of interference with the one or more work areas by the first monitoring target area; information generation processing of generating information about the work in the one or more work areas performed by the monitoring target based on a result of the determination made in the determination processing; and first output processing of outputting information about the work assignment performed by the monitoring target generated in the information generation processing. This work assignment status monitoring program determines whether the monitoring target has performed the work assignment(s) in one or more work areas based on the presence or absence of interference with the one or more work areas by the first monitoring target area where the monitoring target such as the worker is positioned. It is thus possible to infer and monitor the work assignment status of the monitoring target with a smaller amount of information than that in the case where, for example, the movement of the monitoring target is analyzed in detail. That is, this work assignment status monitoring program can efficiently monitor the work assignment status(es) of one or more designated work assignments performed by the monitoring target such as the worker.

The work assignment status monitoring program may further cause a computer to execute: a recording processing of recording, as a plurality of work assignment histories, a plurality of pieces of information generated in the information generation processing and related to the work assignment performed by the monitoring target; normal state decision processing of deciding a normal state for the work assignment performed by the monitoring target from the plurality of work assignment histories recorded in the recording processing; and a second output processing of outputting new information about the work assignment performed by the monitoring target generated in the information generation processing, together with a result of a comparison between the new information about the work assignment performed by the monitoring target generated in the information generation processing and the information about the work assignment in the normal state. Thus, the work assignment status monitoring program can set the normal state of the work assignment order, the work time, and the like for each of the monitoring targets. It is thus possible to present whether or not the normal state for the worker who is the monitoring target is the normal state for the worker who is the monitoring target, for example, even when the work time of a certain work assignment performed by the worker who is the monitoring target is longer than those of other workers due to differences in experience and skill.

The work assignment status monitoring program may further cause the computer to execute: a recording processing of recording, as a plurality of work assignment histories, a plurality of pieces of information generated in the information generation processing and related to the work assignment performed by the monitoring target; normal state decision processing of deciding a normal state for the work assignment performed by the monitoring target from the plurality of recorded work assignment histories recorded in the recording processing; prediction processing of predicting information about a work exceeding the range of the normal state among the plurality of pieces of the information about the work assignments performed by the monitoring target generated next in the information generation processing based on the degree of deviation of the plurality of pieces of information about the work assignments performed by the monitoring target recorded as the plurality of recorded work assignment histories from information about the work assignment in the normal state; and second output processing of outputting a result of the prediction. In this manner, since the work assignment status monitoring program can predict the work that may exceed the range of the normal state for each monitoring target, for example, a warning can be given in advance to the worker who is the monitoring target.

According to the present disclosure, it is possible to provide a work assignment status monitoring system, a work assignment status monitoring method, and a work assignment status monitoring program capable of inferring a work assignment status(es) of one or more designated work assignments being performed by a monitoring target such as a worker or the like with a small amount of information and efficiently monitoring the work assignment status.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through embodiments of the disclosure, but the disclosure according to the claims is not limited to the following embodiments. Further, not all of the configurations described in the embodiments are necessary for solving the problem. For clarity of explanation, the following description and drawings have been omitted and simplified as appropriate. In each of the drawings, the same elements are denoted by the same reference signs, and repeated explanations are omitted if necessary.

First Embodiment

Figure 1:
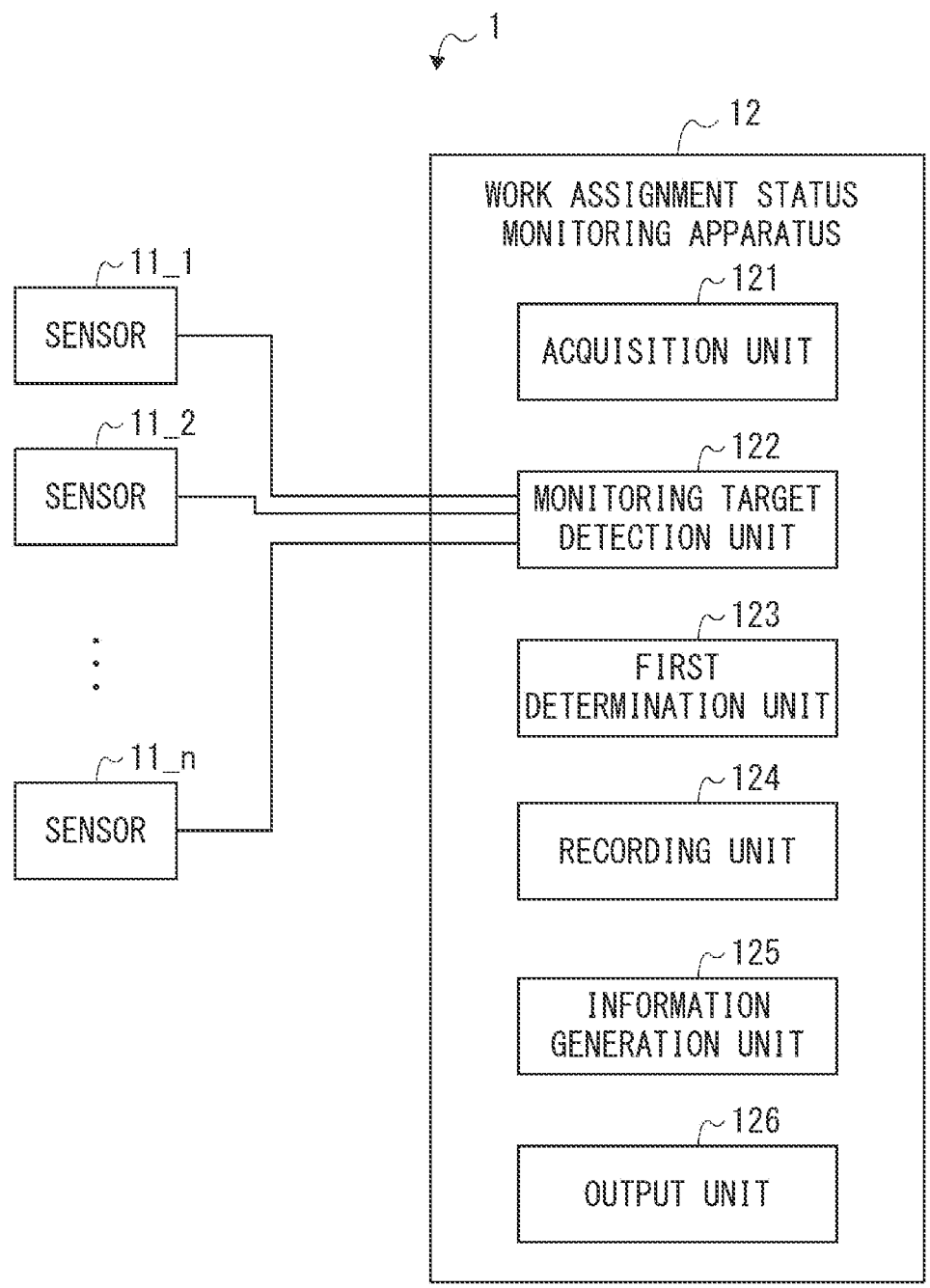
FIG. 1 is a block diagram showing a configuration example of a work assignment status monitoring system according to a first embodiment.
Figure 2:
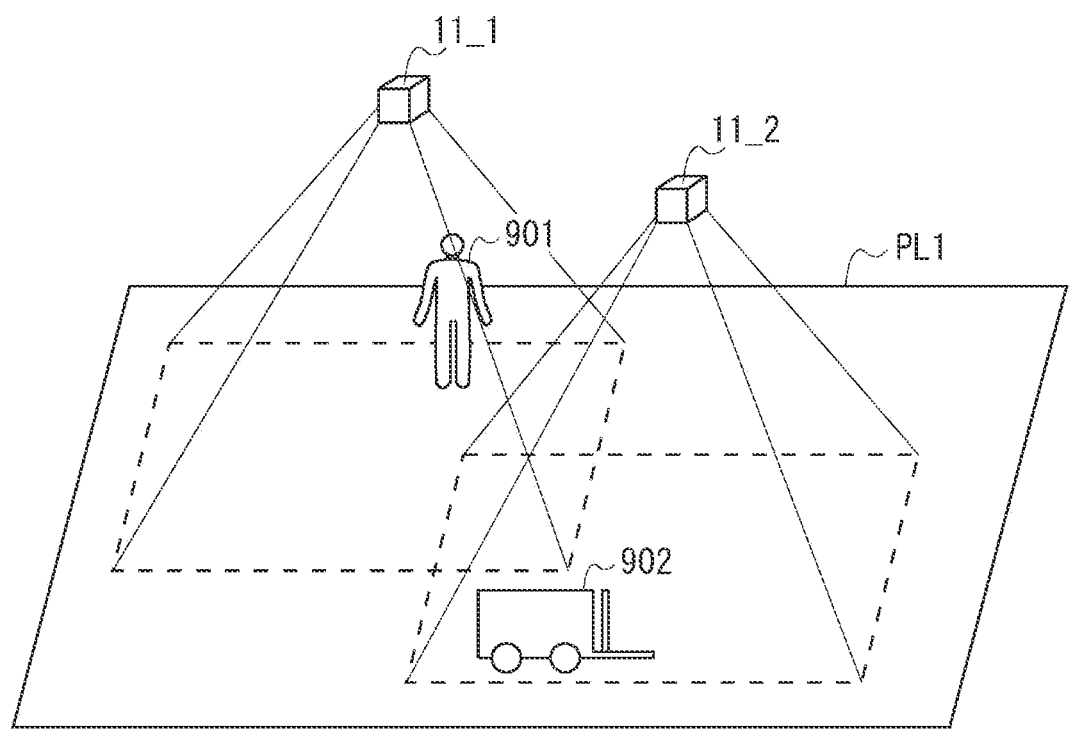
FIG. 2 is a schematic perspective view showing an application example of the work assignment status monitoring system shown in FIG. 1.
Figure 2:
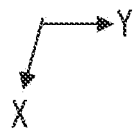
Figure 3:
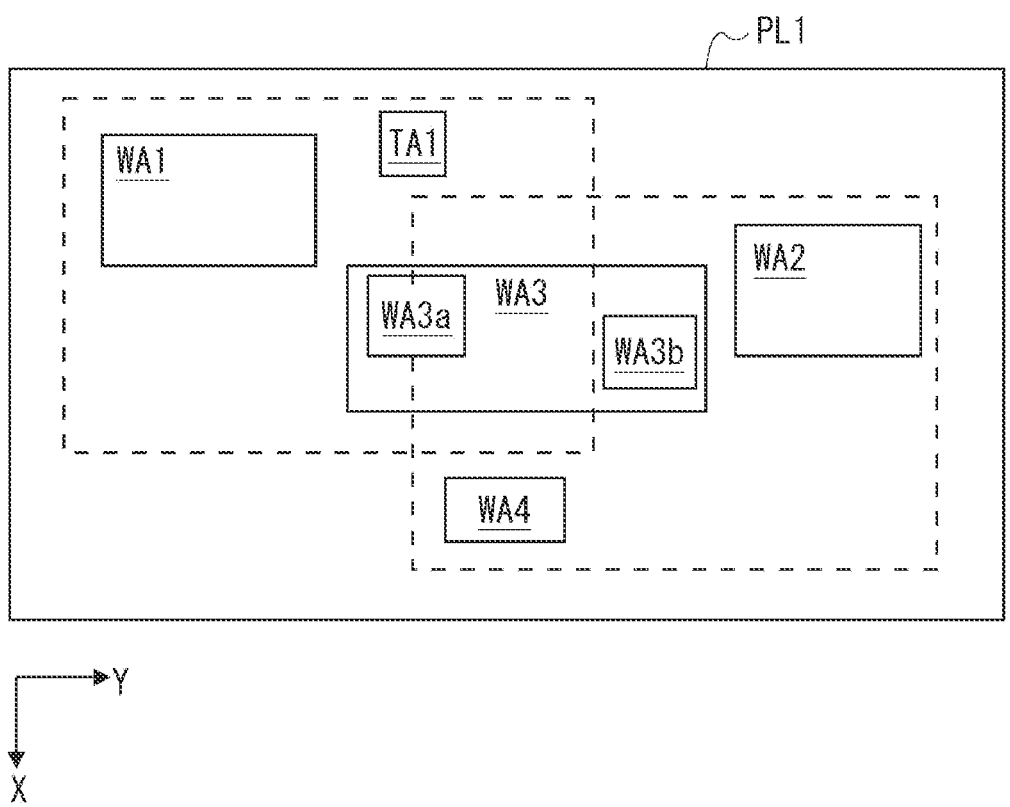
FIG. 3 is a schematic plan view showing an application example of the work assignment status monitoring system shown in FIG. 1.

FIG. 1 is a block diagram showing a configuration example of a work assignment status monitoring system 1 according to a first embodiment. FIGS. 2 and 3 are a schematic perspective view and a schematic plan view, respectively, showing an application example of the work assignment status monitoring system 1 shown in FIG. 1. The work assignment status monitoring system 1 according to this embodiment is applied, for example, to a facility such as a factory having one or more work areas where predetermined work assignments are performed by workers or the like who are monitoring targets, and determines whether each of the monitoring targets has performed the work assignment(s) in one or more work areas based on the presence or absence of interference (contact) with the one or more work areas by an area to be monitored where the monitoring target is positioned. In this way, the work assignment status monitoring system 1 according to this embodiment can infer and monitor the work assignment status of the monitoring target with a smaller amount of information than that in the case where, for example, the movement of the monitoring target is analyzed in detail. That is, the work assignment status monitoring system 1 according to this embodiment can efficiently monitor the work assignment status(es) of one or more designated work assignments performed by a monitoring target such as a worker. A specific description of the work status monitoring system 1 according to this embodiment will be given below.

The work assignment status monitoring system 1 is applied to a facility PL1 such as a factory, and includes n (n is an integer of one or more) sensors 11_1 to 11_$n$ and a work assignment status monitoring apparatus 12. The work assignment status monitoring system 1 may be a single work assignment status monitoring apparatus 12.

The sensors 11_1 to 11_$n$ are installed on the ceiling or the like of the facility PL1, and detects a worker 901 and a mobile body 902 in the facility PL1. The mobile body 902 is, for example, a vehicle such as a forklift or a movable carriage for transporting a product or its parts, a vehicle such as an AGV (Automatic Guided Vehicle) configured to automatically perform a transportation work, or an autonomously movable work robot configured to automatically perform a predetermined work assignment. Some of the sensors 11_1 to 11_$n$ may be attached to any of the mobile bodies 902. Each of the sensors 11_1 to 11_$n$ can simultaneously detect all the workers 901 and the mobile bodies 902 included in a detection range by itself.

Each of the sensors 11_1 to 11_$n$ is, for example, a camera, and is installed so as to be capable of capturing the entire facility including one or more work areas provided in the facility PL1 and moving routes of the worker 901 and the mobile body 902. Each of the sensors 11_1 to 11_$n$ is not limited to a camera, and may instead be any type of sensor such as a distance measuring sensor capable of detecting the worker 901 and the mobile body 902. In this embodiment, a case where n=2, i.e., two sensors 11_1 and 11_2, are provided will be described as an example.

The work assignment status monitoring apparatus 12 monitors the work assignment status of a monitoring target TG in the facility PL1. Here, the monitoring target TG is either the worker 901 or a predetermined mobile body 902$a$ which are the monitoring targets whose operations statuses are to be monitored by the work assignment status monitoring apparatus 12. The predetermined mobile body 902$a$, among the mobile bodies 902 detected by the sensors 11_1 and 11_2, is a vehicle, such as an AGV, or a work robot, which is configured to automatically perform a predetermined work assignment.

Specifically, the work assignment status monitoring apparatus 12 includes an acquisition unit 121, a monitoring target detection unit 122, a first determination unit 123, a recording unit 124, an information generation unit 125, and an output unit 126.

The acquisition unit 121 acquires information about one or more work areas in the facility PL1. The information about the work area includes at least information of a place (a position) where a designated work assignment is performed. The information about the work area may further include a content of the designated work, a minimum time (reference time) required for the designated work, and a maximum work time allowed for the designated work assignment. The acquisition unit 121 may, for example, acquire information about the work area input via an operation terminal by an administrator of the facility PL1 or the like, or may acquire the information about the work area from results of the detection by the sensors 11_1 and 11_2. When the sensors 11_1 and 11_2 are cameras, the acquisition unit 121 may acquire the information about the work areas based on results of analyzing videos captured by the cameras. In the example of FIG. 3, the acquisition unit 121 acquires information about work areas WA1 to WA4 in which places where work assignments are performed are surrounded by frames. The work area WA3 includes work areas WA3$a$ and WA3$b$.

The monitoring target detection unit 122 detects either the worker 901 or the predetermined mobile body 902$a$ as the monitoring target TG by using the sensors 11_1 and 11_2, and defines a monitoring target area TA1 where the monitoring target TG is positioned. The monitoring target area TA1 is defined by a frame surrounding the monitoring target TG, and moves along with the movement of the monitoring target TG. In this embodiment, a case where the monitoring target detection unit 122 detects a certain worker 901 as the monitoring target TG will be described, but the present disclosure is not limited to this. Alternatively, the predetermined mobile body 902a may be detected as the monitoring target TG, or the worker 901 and the predetermined mobile body 902a may be detected as a plurality of the monitoring targets TG. Note that in this embodiment, among the mobile bodies 902 detected by the sensors 11_1 and 11_2, the moving body (forklift) 902 other than the monitoring target TG are defined as the work area WA4 where the monitoring target TG performs a work assignment.

The first determination unit 123 determines whether or not the monitoring target TG has performed the work in the one or more work areas, which are the work areas WA1 to WA4 in the example of FIG. 3, based on the presence or absence of interference with the one or more work areas by the monitoring target area TA1. For example, when the monitoring target area TA1 interferes with the work area WA1, the first determination unit 123 determines that the monitoring target TG has performed a work in the work area WA1. The interference of the monitoring target area TA1 with the work area WA1 is not limited to the case where the monitoring target area TA1 (frame) and the work area WA1 (frame) partially overlap each other, but also includes the case where the monitoring target area TA1 (frame) and the work area WA1 (frame) come to contact with each other.

Note that the first determination unit 123 may determine that the monitoring target TG has performed a work in the work area WA1 when a period of time in which the monitoring target area TA1 interferes with the work area WA1 is more than or equal to the minimum time (reference time) required for a work in the work area WA1.

A result of the determination made by the first determination unit 123 is recorded in the recording unit 124. The recording unit 124 may be provided inside the work assignment status monitoring apparatus 12 or outside the work assignment status monitoring apparatus 12.

The information generation unit 125 generates information about the work assignment performed by the monitoring target TG in each work area based on the result of the determination made by the first determination unit 123. The information about the work in the work area includes at least information about a start time, a work time, and an end time of the work assignment performed by the monitoring target TG in each work area. It is also possible to identify a work assignment order when the work assignments are performed in a plurality of work areas from the information of the start time, work time, and end time of the work assignments performed by the monitoring target TG in the respective work areas.

The information generated by the information generation unit 125 about the work assignment performed by the monitoring target TG in each work area is recorded (accumulated) in the recording unit 124. Note that the information about the work assignment performed by the monitoring target TG in each work area may be recorded (accumulated) in the recording unit 124 in a graphed state as described later.

The output unit 126 outputs the information about the work assignment performed by the monitoring target TG in each work area generated by the information generation unit 125. For example, the output unit 126 causes a monitor to display the information (a work assignment pattern) about the work assignment performed by the monitoring target TG in each work area, which is generated by the information generation unit 125, in a desired display format.

Figure 4:
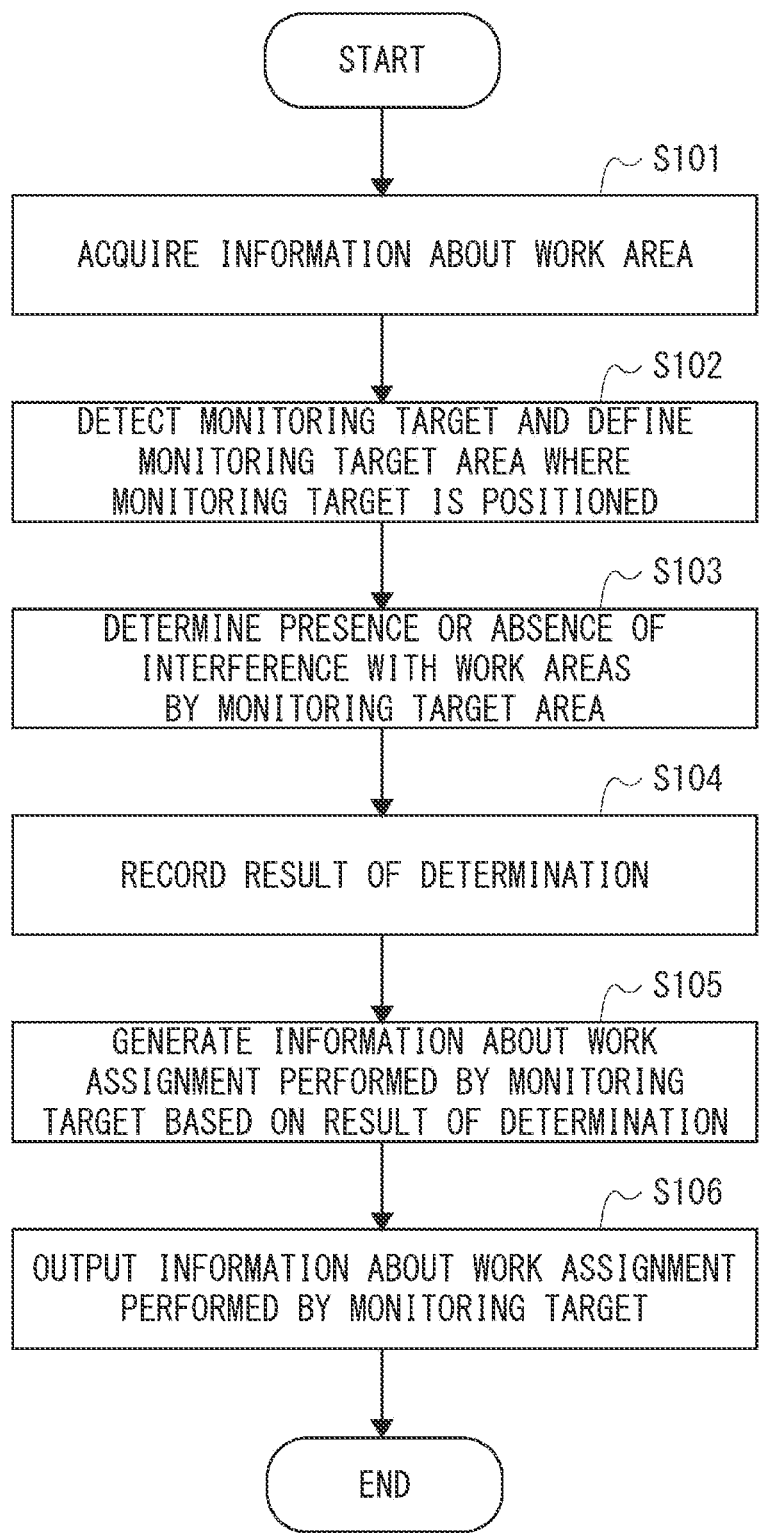
FIG. 4 is a flowchart showing an operation of the work assignment status monitoring system shown in FIG. 1.
Figure 5:
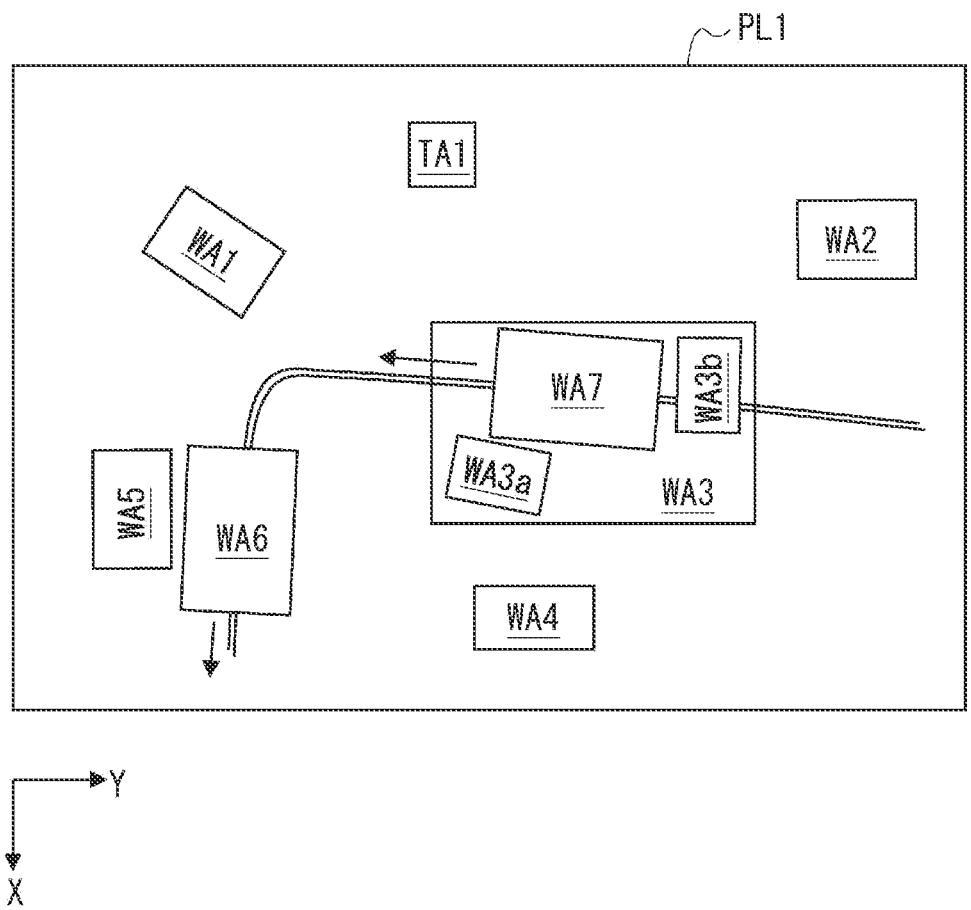
FIG. 5 is a schematic plan view showing in more detail a facility to which the work assignment status monitoring system shown in FIG. 1 is applied.

Next, an operation of the work assignment status monitoring system 1 will be described with reference to FIGS. 4 and 5. FIG. 4 is a flowchart showing the operation of the work assignment status monitoring system 1. FIG. 5 is a schematic plan view showing in more detail the facility PL1 to which the work assignment status monitoring system 1 is applied.

In the work assignment status monitoring system 1, the work assignment status monitoring apparatus 12 first acquires the information about one or more work areas in the facility PL1 (Step S101). In the example of FIG. 5, the work assignment status monitoring apparatus 12 acquires information about work areas WA1 to WA7, which are places where work assignments are performed, surrounded by a frame. The work area WA3 includes work areas WA3a and WA3b.

The work assignment status monitoring apparatus 12 detects the worker 901 as a monitoring target TG by using the sensors 11_1 and 11_2, and defines a monitoring target area TA1 where the monitoring target TG is positioned (Step S102). The monitoring target area TA1 is defined by a frame surrounding the monitoring target TG, and moves along with the movement of the monitoring target TG. One mobile body (forklift) and two AGVs (first and second AGVs), which are the mobile bodies 902 other than the monitoring target TG detected by the sensors 11_1 and 11_2, are defined as the work areas WA4, WA6, and WA7, respectively, where the monitoring target TG performs works.

After that, the work assignment status monitoring apparatus 12 determines whether or not the monitoring target TG has performed work assignments in the work areas WA1 to WA7 based on the presence or absence of interference with the work areas WA1 to WA7 by the monitoring target area TA1 (Step S103). The result of determining whether or not the monitoring target TG has performed work assignments in the work assignment areas WA1 to WA7 is recorded in the recording unit 124 (Step S104).

After that, the work assignment status monitoring apparatus 12 generates information (a work assignment pattern) about the work assignment performed by the monitoring target TG in each of the work areas WA1 to WA7 based on the above result of the determination (Step S105), and, for example, displays it on a monitor (Step S106).

Figure 6:
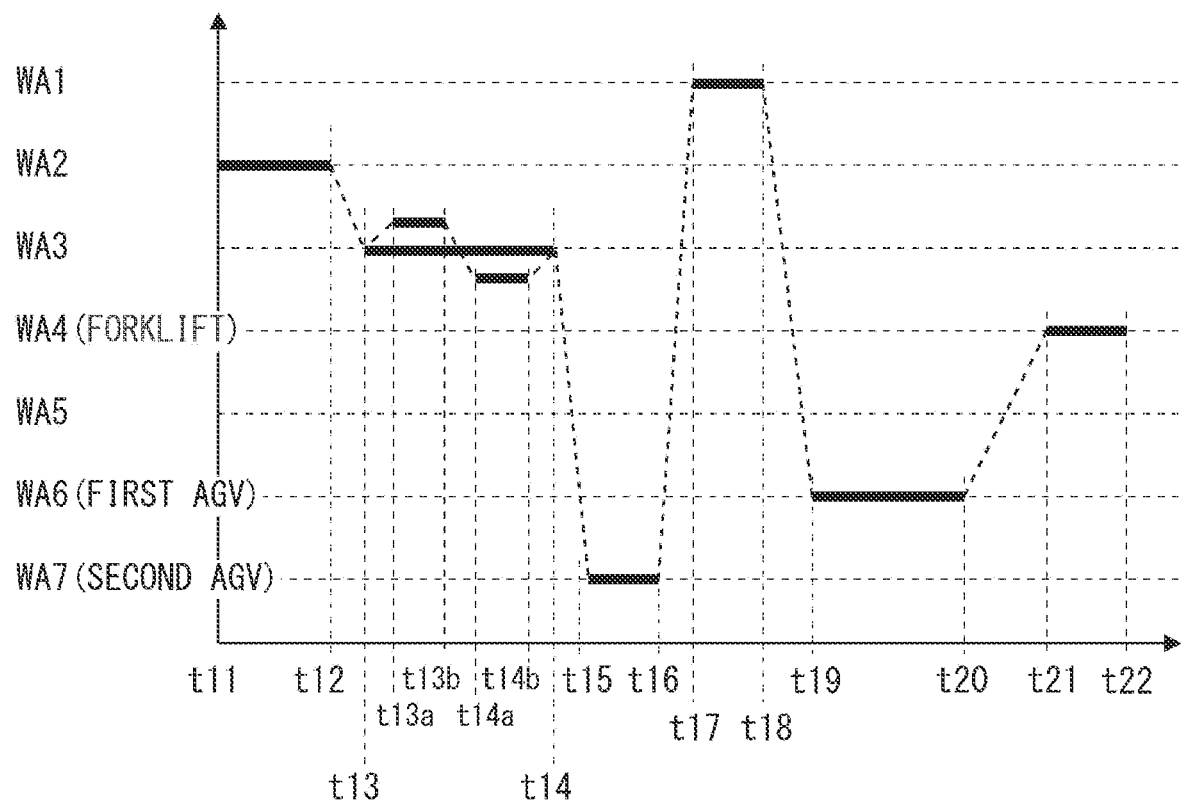
FIG. 6 shows a first example of information about work assignments performed by a monitoring target output from a work assignment status monitoring apparatus provided in the work assignment status monitoring system shown in FIG. 1.

FIG. 6 shows a first example of the information about work assignments performed by the monitoring target TG output from the work assignment status monitoring apparatus 12. In the example of FIG. 6, a work assignment pattern performed by the monitoring target TG is displayed on the monitor in a two-dimensional graph. In FIG. 6, the horizontal axis represents time, and the vertical axis represents the presence or absence of a work assignment performed by the monitoring target TG in each work area.

Referring to FIG. 6, first, the monitoring target TG performs a work in the work area WA2 (time t11 to time t12). After that, the monitoring target TG performs a work in the work area WA3 (time t13 to time t14). More specifically, the monitoring target TG first performs a work in the work area WA3a of the work area WA3 (time t13a to time t13b), and then performs a work in the work area WA3b (time t14a to time t14b). Note that the work assignment status monitoring apparatus 12 can appropriately adjust whether or not the two work assignments in the work areas WA3a and WA3b are displayed separately on the monitor or displayed as one work in the work area WA3. After that, the monitoring target TG performs a work in the work area WA7 (time t15 to time t16). Here, the work area WA7 is an area where the second AGV is positioned. Thus, there is a possibility that the monitoring target TG may be loading the second AGV or operating the second AGV. After that, the monitoring target TG performs a work in the work area WA1 (time t17 to time t18), continues to perform work assignments in the work area WA6 (time t19 to time t20), and continues to perform work assignments in the work area WA4 (time t21 to time t22). The work area WA6 is an area where the first AGV is positioned. Therefore, there is a possibility that the monitoring target TG may be loading the first AGV or operating the first AGV in the work area WA6. The work area WA4 is an area where a forklift is positioned. Therefore, there is a possibility that the monitoring target TG may be loading the forklift or operating the forklift in the work area WA4.

As described above, the work assignment status monitoring system 1 according to this embodiment determines whether or not the monitoring target TG has performed work assignments in one or more work areas based on the presence or absence of interference (contact) with the one or more work areas by the monitoring target area TA1 where the monitoring target TG such as a worker is positioned. By doing so, the work assignment status monitoring system 1 according to this embodiment can infer and monitor the work assignment status of the monitoring target TG with a smaller amount of information than that in the case where, for example, the movement of the monitoring target TG is analyzed in detail. That is, the work assignment status monitoring system 1 according to this embodiment can efficiently monitor the work assignment status(es) of one or more designated work assignments performed by the monitoring target TG such as a worker.

Note that in this embodiment, in the work assignment status monitoring system 1, the work assignment status monitoring apparatus 12 is described with reference to an example in which the monitoring target area TA1 where the monitoring target TG is positioned is defined. However, the present disclosure is not limited to this. That is, the work assignment status monitoring apparatus 12 may be configured to further define a second monitoring target area TA2 in which a predetermined part of the monitoring target TG, such as a worker's fingertip who is the monitoring target TG, is positioned. For example, the work assignment status monitoring apparatus 12 determines whether or not the worker's fingertip, who is the monitoring target TG, has performed work in one or more work areas based on the presence or absence of interference with one or more work areas by the monitoring target area TA2. In this manner, the work assignment status monitoring system 1 can more accurately infer the work assignment status of the monitoring target TG.

In this embodiment, in the work assignment status monitoring system 1, the work assignment status monitoring apparatus 12 displays the work assignment pattern performed by the monitoring target TG on the monitor in a display format as shown in FIG. 6, but the present disclosure is not limited to this. The work assignment status monitoring apparatus 12 may display the work assignment pattern performed by the monitoring target TG on the monitor in any display format that enables monitoring of the work assignment status of the monitoring target TG. Hereinafter, a brief description will be given with reference to FIGS. 7 and 8.

Figure 7:
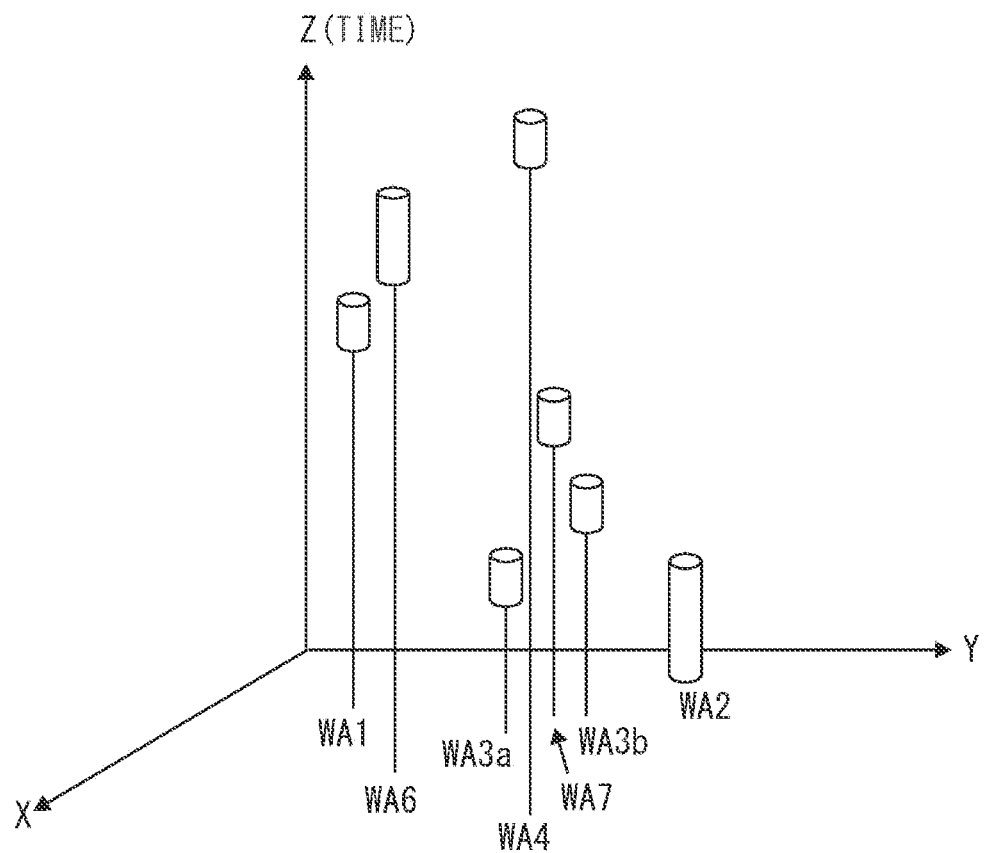
FIG. 7 shows a second example of information about work assignments performed by the monitoring target output from the work assignment status monitoring apparatus provided in the work assignment status monitoring system shown in FIG. 1.

FIG. 7 shows a second example of the information about the work assignments performed by the monitoring target TG output from the work assignment status monitoring apparatus 12. In the example of FIG. 7, the work assignment pattern performed by the monitoring target TG is displayed on the monitor in a three-dimensional graph. In FIG. 7, the X-axis and Y-axis represent a position (plane coordinate) of the facility PL1, and the Z-axis represents the time. By making the resolution of the plane coordinates adjustable, for example, it is possible to allow a selection of whether the two work assignments in the work areas WA3$a$ and WA3$b$ are displayed separately or as one work in the work area WA3. As described above, the work assignment status monitoring apparatus 12 may display the work assignment pattern performed by the monitoring target TG on the monitor in a display format as shown in FIG. 7.

Figure 8:
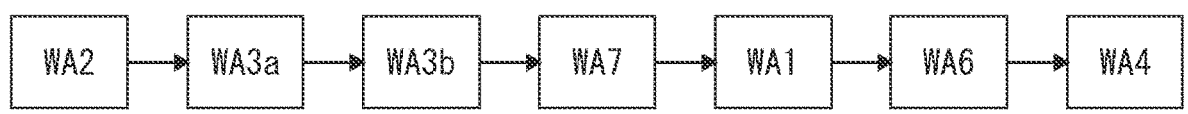
FIG. 8 shows a third example of information about work assignments performed by the monitoring target output from the work assignment status monitoring apparatus provided in the work assignment status monitoring system shown in FIG. 1.

FIG. 8 shows a third example of the information about the work assignments performed by the monitoring target TG output from the work assignment status monitoring apparatus 12. In the example of FIG. 8, the work assignment pattern performed by the monitoring target TG is displayed on the monitor in a display format of an event network. In an event network, an event (work) is represented as a node (a block provided with a name of a work area where the work is performed), and an event and a subsequent event are connected to each other by an edge (line segment). As described above, the work assignment status monitoring apparatus 12 may display the work assignment pattern performed by the monitoring target TG on the monitor in a display format as shown in FIG. 8. As the display format, a Petri net may be used instead of an event network.

Second Embodiment

Figure 9:
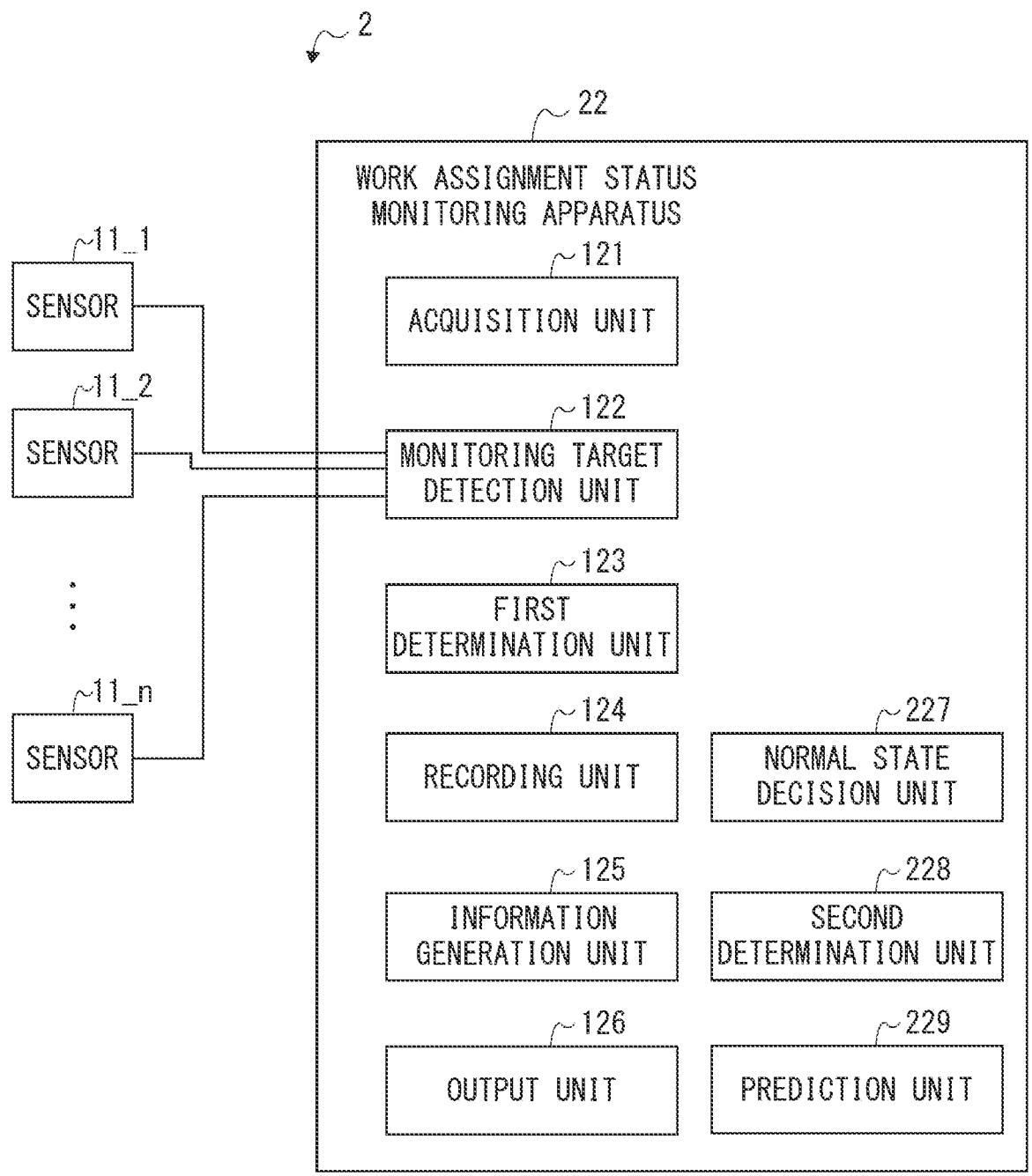
FIG. 9 is a block diagram showing a configuration example of a work assignment status monitoring system according to a second embodiment.

FIG. 9 is a block diagram showing a configuration example of a work assignment status monitoring system 2 according to a second embodiment. As compared with the work assignment status monitoring system 1, the work assignment status monitoring system 2 includes a work assignment status monitoring apparatus 22 in place of the work assignment status monitoring apparatus 12. As compared with the work assignment status monitoring apparatus 12, the work assignment status monitoring apparatus 22 further includes a normal state decision unit 227, a second determination unit 228, and a prediction unit 229. The other components of the work assignment status monitoring apparatus 22 are the same as those of the work assignment status monitoring apparatus 12, and therefore description thereof will be omitted.

(Determination Function of Work assignment status Monitoring Apparatus 22)

Figure 10:
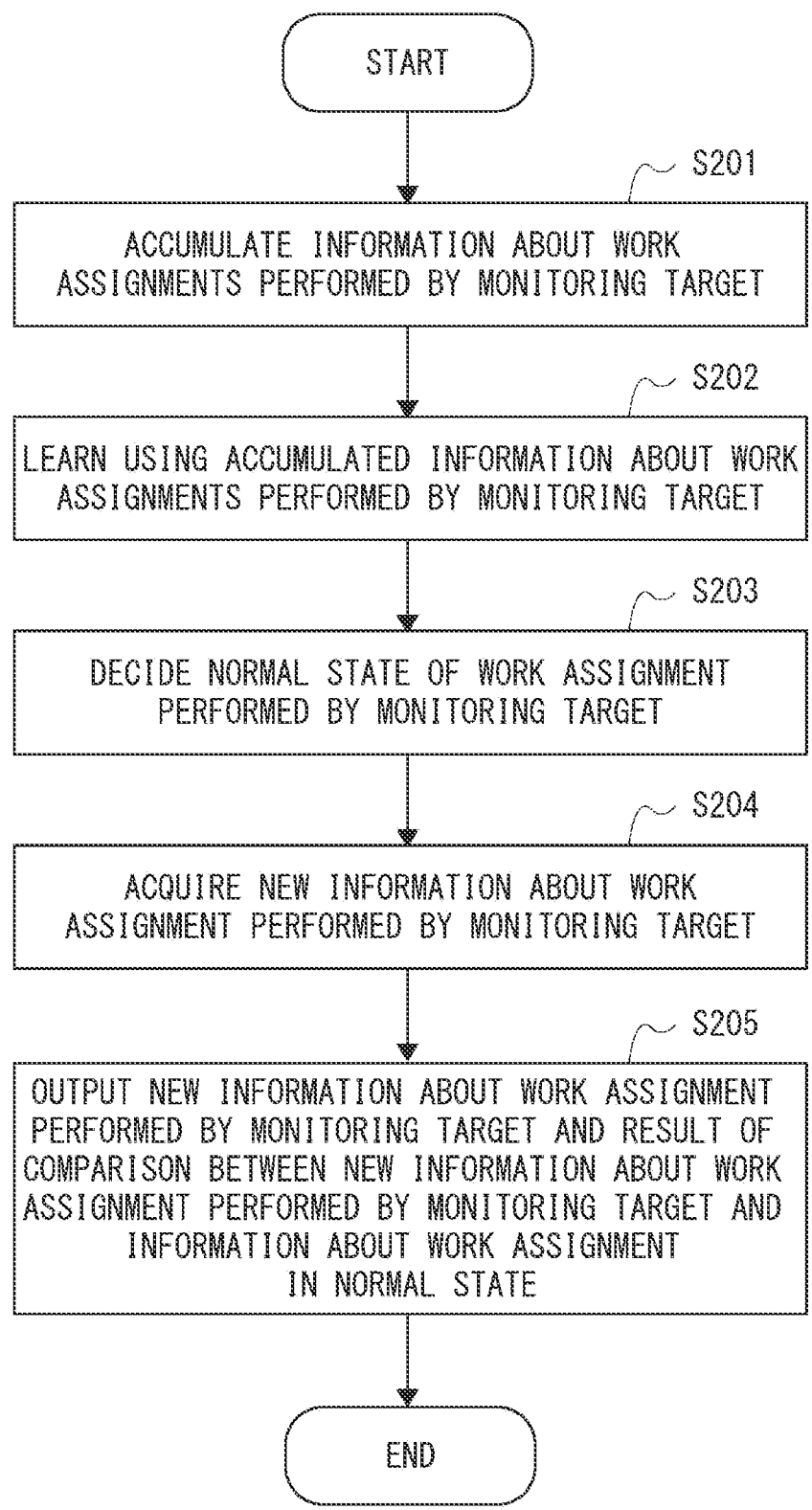
FIG. 10 is a flowchart showing a determination operation performed by the work assignment status monitoring apparatus provided in the work assignment status monitoring system shown in FIG. 9.

First, the determination function of the work assignment status monitoring apparatus 22 will be described with reference to FIGS. 9 and 10. FIG. 10 is a flowchart showing a determination operation performed by the work assignment status monitoring apparatus 22.

In the work assignment status monitoring apparatus 22, the information generation unit 125 generates a plurality of pieces of information about the work assignments performed by the monitoring target TG as a result of repeatedly monitoring the work assignment status of the work assignments performed by the monitoring target TG in the facility PL1. The plurality of pieces of information about the work assignments performed by the monitoring target TG generated by the information generation unit 125 are recorded (accumulated) in the recording unit 124 as a plurality of work assignment histories (Step S201).

In the work assignment status monitoring apparatus 22, the normal state decision unit 227 performs learning using the plurality of work assignment histories recorded in the recording unit 124 (Step S202), and decides a normal state of the work assignment performed by the monitoring target TG based on a result of the learning (Step S203). For example, the normal state decision unit 227 decides the normal state as a statistical model using a function shape and a network assignment pattern as a random variable. The normal state for the work assignment performed by the monitoring target TG is, for example, a normal (average) work time in each work area and a normal work assignment order performed by the monitoring target TG. Note that the normal state of the work assignment performed by the monitoring target TG is not limited to one type, and may be classified into two or more types.

Here, as a result of monitoring the status of the work assignment newly performed by the monitoring target TG, when new information (a newly performed work assignment pattern) about the work assignment performed by the monitoring target TG is generated by the information generation unit 125 (Step S204), the output unit 126 outputs the new information about the work assignment performed by the monitoring target TG (the newly performed work assignment pattern) together with the result of a comparison between the new information about the work assignment performed by the monitoring target TG and the information about the work assignment in the normal state (a work assignment pattern in the normal state) (Step S205).

Note that output unit 126 may be configured to output the new information about the work assignment performed by the monitoring target TG (the newly performed work assignment pattern) in a highlighted manner in accordance with the degree of deviation from the information about the work assignment in the normal state (the work assignment pattern in the normal state) to output the new information about the work assignment performed by the monitoring target TG. For example, if the work time in the work area WA1 included in the newly performed work assignment pattern is longer than the work time in the work area WA1 included in the work assignment pattern in the normal state, the output unit 126 may cause the corresponding part to flash and be displayed or may cause the corresponding part to be displayed in a color different from colors of the other parts.

In the work assignment status monitoring apparatus 22, the second determination unit 228 determines whether or not the new information about the work assignment performed by the monitoring target TG (the newly performed work assignment pattern) is included in a range of the normal state based on the degree of deviation of the new information about the work assignment performed by the monitoring target TG from the information about the work assignment performed in the normal state (the work assignment pattern in the normal state). A method such as statistical divergence is used to measure the degree of deviation. The output unit 126 may further output a result of the determination made by the second determination unit 228, which is, information as to whether or not the newly performed work assignment pattern is included in the range of the work assignment pattern in the normal state.

As described above, the work assignment status monitoring system 2 can set the normal state of the work assignment order, the work time, and the like for each of the monitoring targets TG. It is thus possible to present whether or not the normal state for the worker who is the monitoring target TG is the normal state for the worker who is the monitoring target TG, for example, even when the work time of a certain work assignment performed by the worker who is the monitoring target TG is longer than those of other workers due to differences in experience and skill.

(Prediction Function of Work Assignment Status Monitoring Apparatus 22)

Figure 11:
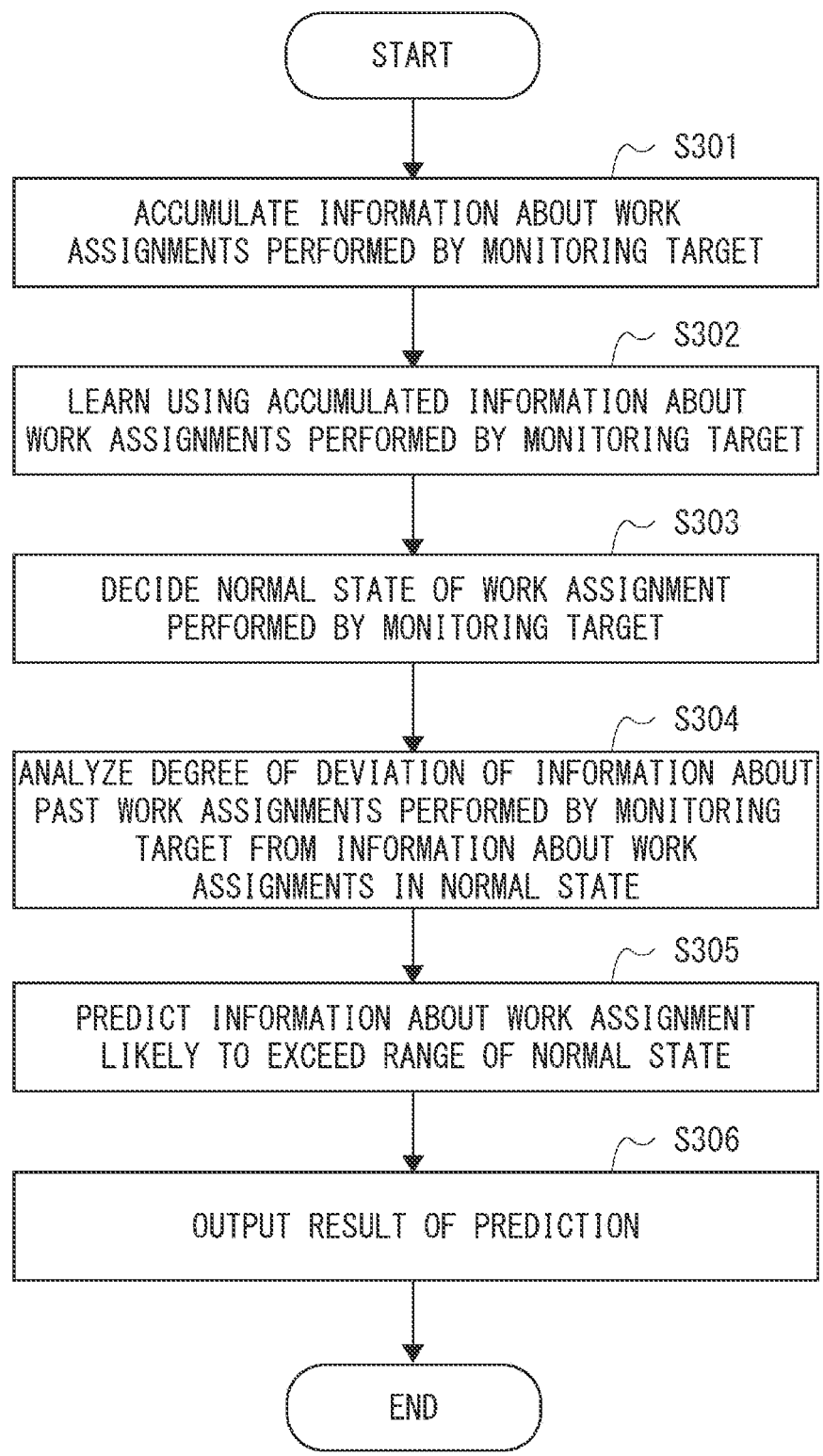
FIG. 11 is a flowchart showing a prediction operation performed by the work assignment status monitoring apparatus provided in the work assignment status monitoring system shown in FIG. 9.

Next, a prediction function of the work assignment status monitoring apparatus 22 will be described with reference to FIGS. 9 and 11. FIG. 11 is a flowchart showing a predicted operation performed by the work assignment status monitoring apparatus 22.

In the work assignment status monitoring apparatus 22, the information generation unit 125 generates a plurality of pieces of information about the work assignments performed by the monitoring target TG as a result of repeatedly monitoring the work assignment status of the work assignments performed by the monitoring target TG in the facility PL1. The plurality of pieces of information about the work assignment performed by the monitoring target TG generated by the information generation unit 125 are recorded (accumulated) in the recording unit 124 as a plurality of work assignment histories (Step S301).

In the work assignment status monitoring apparatus 22, the normal state decision unit 227 performs learning using the plurality of work assignment histories recorded in the recording unit 124 (Step S302), and decides a normal state of the work assignment performed by the monitoring target TG based on a result of the learning (Step S303). For example, the normal state decision unit 227 decides the normal state as a statistical model using a function shape and a network pattern as a random variable. The normal state for the work assignment performed by the monitoring target TG is, for example, a normal (average) work time in each work area and a normal work assignment order performed by the monitoring target TG. Note that the normal state of the work assignment performed by the monitoring target TG is not limited to one type, and may be classified into two or more types.

Here, in the work assignment status monitoring apparatus 22, the prediction unit 229 analyzes the degree of deviation of the plurality of pieces of information about the work assignments performed by the monitoring target TG (a plurality of work assignment patterns performed in the past) recorded as the plurality of work assignment histories in the recording unit 124 from the information (the work assignment patterns in the normal state) about the work assignment in the normal state (Step S304). Next, the prediction unit 229 predicts information (the work time and the work assignment order) about the work assignment likely to exceed the range of the normal state among the work assignment patterns to be performed by the monitoring target TG in the future (Step S305).

For example, if there are a relatively large number of work assignment patterns including a specific work assignment in which the work time exceeds the range of the normal state among the plurality of work assignment patterns performed in the past, the prediction unit 229 predicts that the work time of the specific work assignment may exceed the range of the normal state among the plurality of work assignments included in the work assignment pattern to be performed by the monitoring target TG in the future.

The output unit 126 outputs a result of the prediction made by the prediction unit 229 (Step S306). For example, the output unit 126 outputs information indicating that among a plurality of work assignments included in a work assignment pattern to be performed by the monitoring target TG in the future, the work time of a specific work assignment may exceed the range of the normal state. Alternatively, the output unit 126 may output a predicted value of the work assignment pattern to be performed by the monitoring target TG in the future together with a result of the comparison between the predicted value of the work assignment pattern to be performed by the monitoring target TG in the future and the information about the work assignment in the normal state (the work assignment pattern in the normal state).

As described above, since the work assignment status monitoring system 2 can predict the work assignment that may exceed the range of the normal state for each monitoring target TG, for example, a warning can be given in advance to the worker who is the monitoring target TG.

Other components and operations of the work assignment status monitoring system 2 are the same as those of the work assignment status monitoring system 1, and therefore description thereof will be omitted.

As described above, the work assignment status monitoring system 2 according to this embodiment can achieve the effect equivalent to that of the work assignment status monitoring system 1. Furthermore, the work assignment status monitoring system 2 according to this embodiment can set a normal state for the work assignment order, the work time, etc., for each monitoring target TG. Therefore, for example, even if the work time of a certain work assignment performed by a worker who is the monitoring target TG is longer than those of other workers due to a difference in experience or skill, it is possible to present whether or not it is a normal state for the worker who is the monitoring target TG. Moreover, since the work assignment status monitoring system 2 according to this embodiment can predict a work assignment that may exceed the range of the normal state for each monitoring target TG, for example, a warning can be given in advance to the worker who is the monitoring target TG.

Note that the work assignment status monitoring apparatus 22 may have only one of the determination function and the prediction function.

In addition, the work assignment status monitoring apparatus 22 may define a predetermined work assignment pattern as a work assignment pattern in an abnormal state. By doing so, when the predetermined work assignment pattern is about to be performed by the monitoring target TG, the work assignment status monitoring apparatus 22 can warn not to perform the predetermined work assignment pattern.

Further, the work assignment status monitoring apparatus 22 may decide the normal state after creating a DSM (Design Structure Matrix) from work assignment histories recorded in the recording unit 124. A brief description will be given below with reference to FIGS. 12 to 15.

Figure 12:
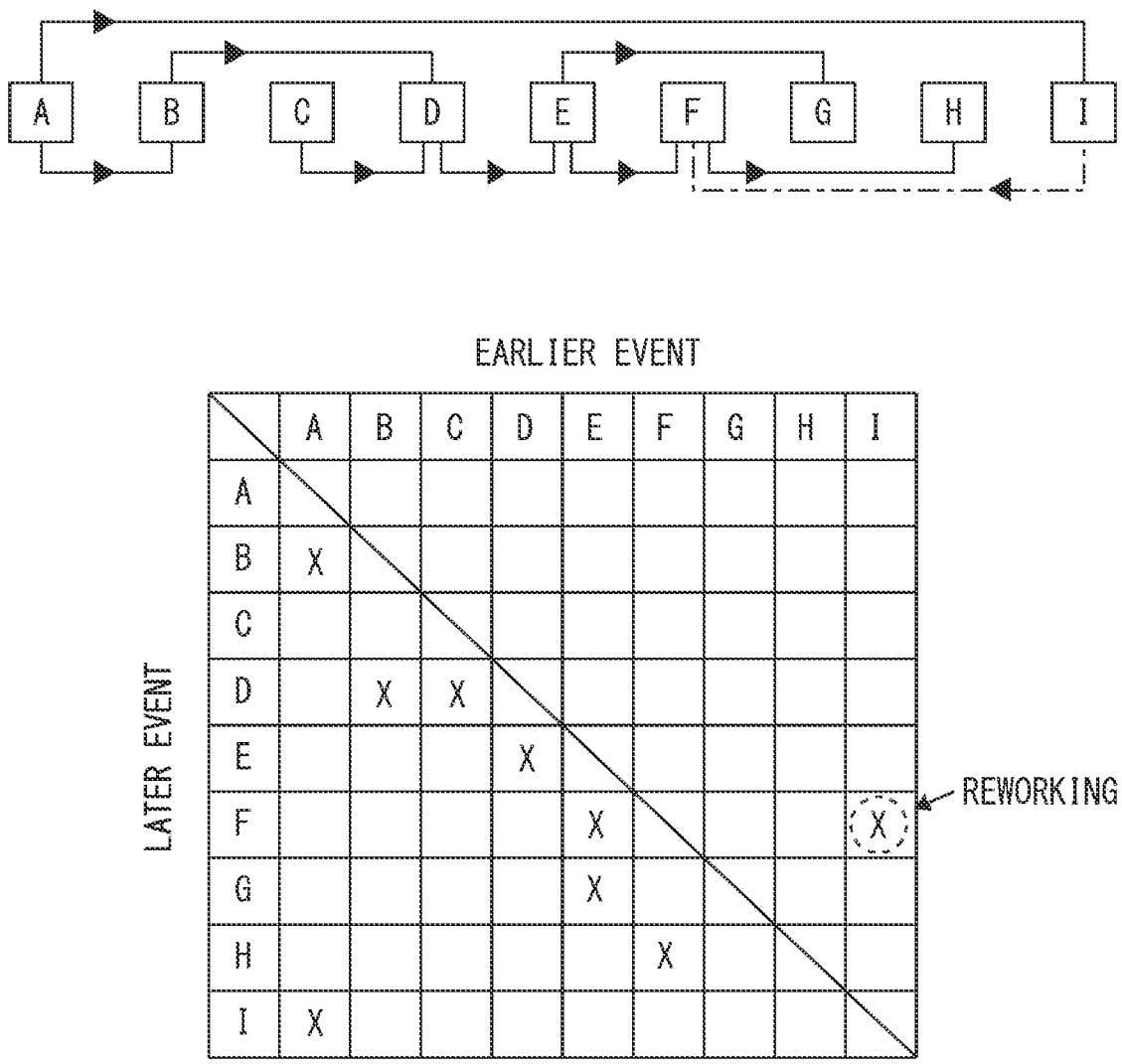
FIG. 12 shows an example of an event network classified from a plurality of work assignment histories and a work assignment procedure of a plurality of events on the event network in a matrix.
Figure 13:
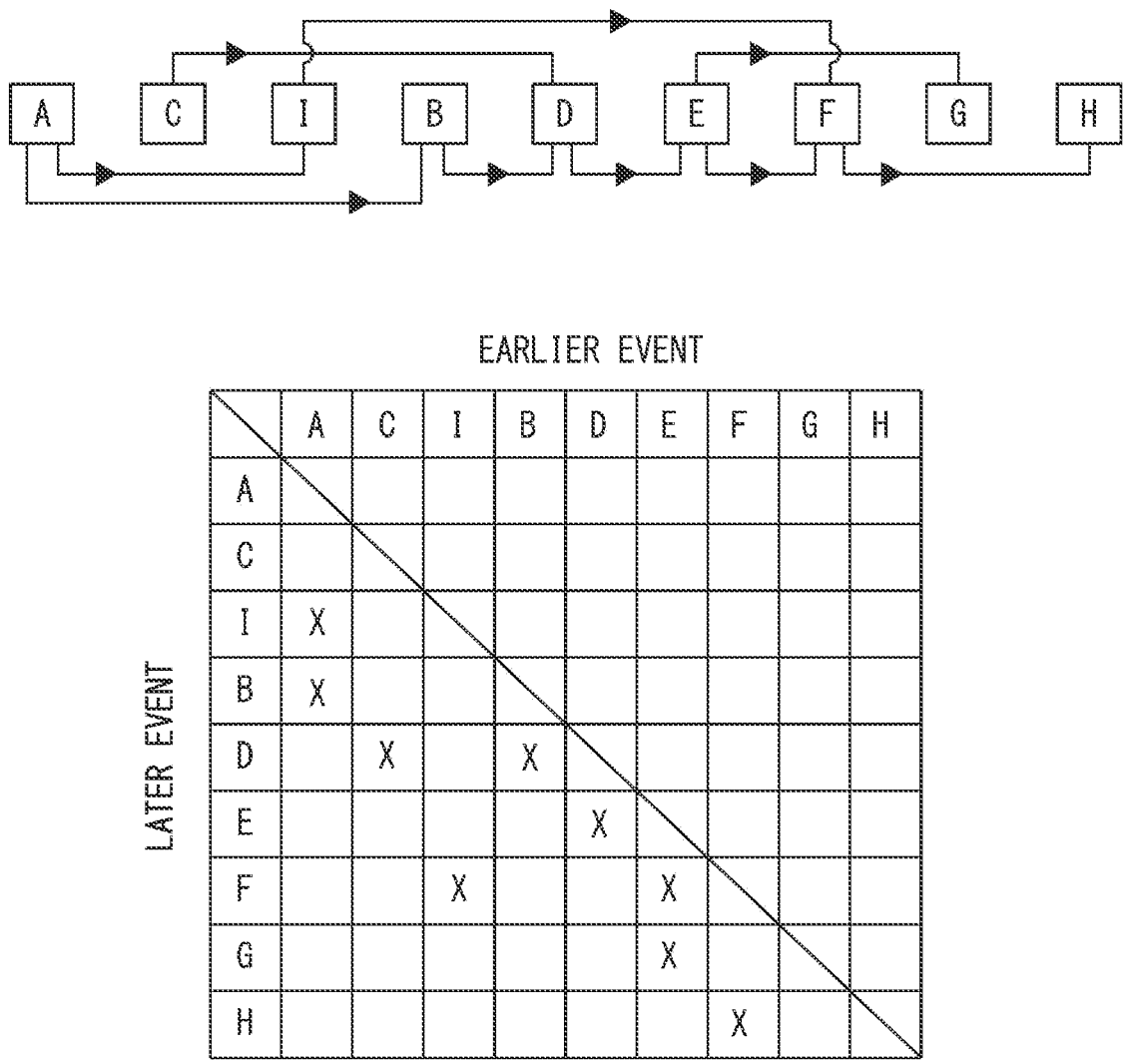
FIG. 13 shows an example of an event network classified from a plurality of work assignment histories and a work assignment procedure of a plurality of events on the event network in a matrix.
Figure 14:
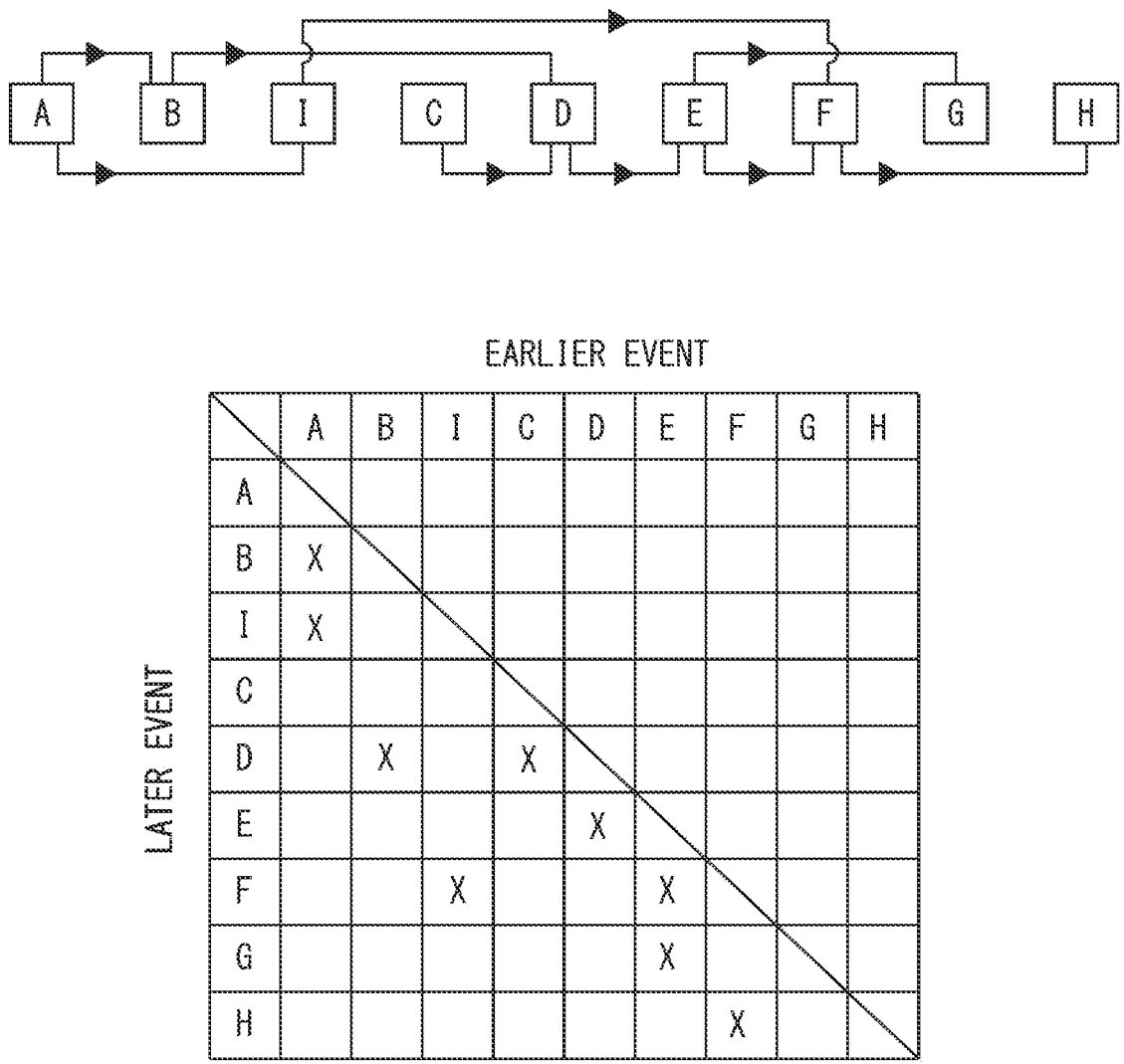
FIG. 14 shows an example of an event network classified from a plurality of work assignment histories and a work assignment procedure of a plurality of events on the event network in a matrix.

FIGS. 12 to 14 are diagrams in which three event networks classified from a plurality of work assignment histories and work assignment procedures of a plurality of events on the event networks are displayed in a matrix. In the examples of the event networks shown in FIGS. 12 to 14, it is assumed that events (designated work assignments) occur in alphabetical order. Further, in the examples of the event networks shown in FIGS. 12 to 14, the solid arrows represent procedures of prerequisite work assignments performed by the monitoring target TG, and the dashed arrow represents reworking in a work assignment procedure performed by the monitoring target TG. The "X" displayed in the matrix represents procedures corresponding to the arrows of the event networks.

Figure 15:
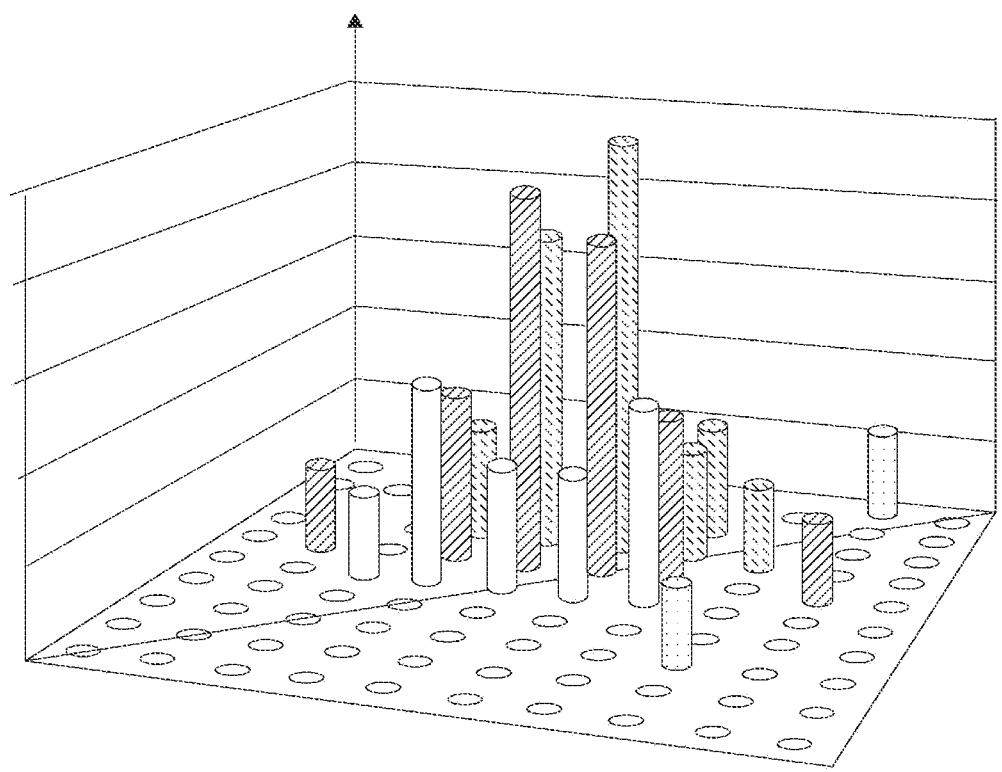
FIG. 15 shows a probability distribution defined on the DSM.

When the work assignment status monitoring apparatus 22 accumulates "X" appearing in each matrix among the matrix components shown in FIGS. 12 to 14, a probability distribution can be defined on a matrix shown in FIG. 15, and this probability distribution can be decided as the normal state of the work assignment procedure performed by the monitoring target TG.

The present disclosure is not limited to the above-described embodiments, and may be suitably modified without departing from the spirit.

Further, the present disclosure can be implemented by causing a Central Processing Unit (CPU) to execute a computer program in part or in whole of the processing of the work assignment status monitoring apparatuses 12 and 22.

The above program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A work assignment status monitoring system comprising:
   one or more sensors, each including a camera, configured to capture a moving route of a predetermined mobile body; and
   a central processing unit coupled to the one or more sensors, and configured to:
   acquire information about one or more work areas based on a result including the moving route captured by the one or more sensors;
   detect the predetermined mobile body as a monitoring target, by the one or more sensors, and define a first monitoring target area where the monitoring target is positioned, the predetermined mobile body including an autonomously movable work robot that is configured to automatically perform a work assignment in accordance with one or more instructions;
   determine whether or not the monitoring target has performed the work assignment in the one or more work areas based on a frame of the first monitoring target area and a frame of the one or more work areas come to contact with each other;
   generate information about the work assignment in the one or more work areas performed by the monitoring target based on a result of the determination made by the central processing unit; and
   output information about the work assignment performed by the monitoring target generated by the central processing unit including adjusting whether the work assignment in one of the one or more work areas and another work assignment in a second of the one or more work areas are displayed separately or as a single work assignment on a monitor based on adjusting a resolution of plane coordinates of a facility including the one or more work areas and in response to the monitoring target performing the work in the one or more work areas, wherein the frame of the first monitoring target area moves in accordance with movement of the monitoring target, wherein the central processing unit is configured to:
  perform learning using a plurality of work assignment histories that are recorded, and decide a predetermined state of the work assignment performed by the monitoring target in response to a result of the learning, the predetermined state being decided as a statistical model using a function shape and a network assignment pattern as a random variable,
  output the information about the work assignment in a highlighted manner in accordance with a degree of deviation from the information about the work assignment in the predetermined state, the highlighted manner including causing a corresponding flash display in response to a work time in the work area included in the newly performed work assignment pattern being longer than a work time in the work area included in the work assignment pattern in the predetermined state,
  define, using the one or more sensors, the first monitoring target area based on a frame surrounding the monitoring target and that moves along in accordance with movement of the monitoring target, and
  display, on the monitor, the work assignment pattern performed by the monitoring target in accordance with the adjusted resolution.

2. The work assignment status monitoring system according to claim 1, wherein
  the central processing unit is configured to alternatively determine, in each of the work areas, that the monitoring target has performed the work assignment in the work area when a period of time of an interference with the work area by the first monitoring target area is more than or equal to a reference time set in the work area.

3. The work assignment status monitoring system according to claim 1, wherein
  the information about the work assignment performed by the monitoring target in the one or more work areas includes information about a start time, the work time, and an end time of the work assignment performed by the monitoring target in each of the work areas.

4. The work assignment status monitoring system according to claim 1, wherein
  the one or more work areas include an area where another mobile body other than the predetermined mobile body, which is the monitoring target, is positioned.

5. The work assignment status monitoring system according to claim 1, wherein
  the central processing unit is configured to further detect a predetermined part of the monitoring target and define a second monitoring target area where the predetermined part is positioned.

6. The work assignment status monitoring system according to claim 1, wherein the central processing unit is further configured to:
  record, as the plurality of work assignment histories, a plurality of pieces of information generated by the central processing unit and related to the work assignment performed by the monitoring target;
  decide a normal state for the work assignment performed by the monitoring target from the plurality of work assignment histories recorded in the central processing unit; and
  output new information about the work assignment performed by the monitoring target generated by the central processing unit, together with a result of a comparison between the new information about the work assignment performed by the monitoring target generated by the central processing unit and information about the work assignment in the normal state.

7. The work assignment status monitoring system according to claim 6, wherein the central processing unit is further configured to:
  determine whether or not the new information about the work assignment performed by the monitoring target is included in a range of the normal state based on the degree of deviation of the new information about the work assignment performed by the monitoring target from the information about the work assignment performed in the normal state, and
  output a result of the determination made by the central processing unit.

8. The work assignment status monitoring system according to claim 1, wherein the central processing unit is further configured to:
  record, as the plurality of work assignment histories, a plurality of pieces of information generated by the central processing unit and related to the work assignment performed by the monitoring target;
  decide a normal state for the work assignment performed by the monitoring target from the plurality of work assignment histories recorded in the central processing unit;
  predict information about a work assignment exceeding a range of the normal state among the plurality of pieces of the information about the work assignments performed by the monitoring target generated next by the central processing unit based on a degree of deviation of the plurality of pieces of information about the work assignments performed by the monitoring target recorded as the plurality of work assignment histories in the central processing unit from information about the work assignment in the normal state; and
  output a result of the prediction made by the central processing unit.

9. A work assignment status monitoring method comprising:
  acquiring information about one or more work areas based on a result including a moving route of a predetermined mobile body captured by one or more sensors that each include a camera;
  detecting the predetermined mobile body as a monitoring target and define a first monitoring target area where the monitoring target is positioned, the predetermined mobile body including an autonomously movable work robot that is configured to automatically perform the work assignment in accordance with one or more instructions;

detecting the monitoring target by the one or more sensors;

determining whether or not the monitoring target has performed the work assignment in the one or more work areas based on a frame of the first monitoring target area and a frame of the one or more work areas come to contact with each other;

generating information about the work assignment in the one or more work areas performed by the monitoring target based on a result of the determination; and outputting information about the work assignment performed by the monitoring target generated based on the result of the determination including adjusting whether the work assignment in one of the one or more work areas and another work assignment in a second of the one or more work areas are displayed separately or as a single work assignment on a monitor based on adjusting a resolution of plane coordinates of a facility including the one or more work areas and in response to the monitoring target performing the work in the one or more work areas, wherein the frame of the first monitoring target area moves in accordance with movement of the monitoring target, the work assignment status monitoring method further comprising performing:

learning using a plurality of work assignment histories that are recorded, and deciding a predetermined state of the work assignment performed by the monitoring target in response to a result of the learning, the predetermined state being decided as a statistical model using a function shape and a network assignment pattern as a random variable, outputting the information about the work assignment in a highlighted manner in accordance with a degree of deviation from the information about the work assignment in the predetermined state, the highlighted manner including causing a corresponding flash display in response to a work time in the work area included in the newly performed work assignment pattern being longer than a work time in the work area included in the work assignment pattern in the predetermined state, defining, using the one or more sensors, the first monitoring target area based on a frame surrounding the monitoring target and that moves along in accordance with movement of the monitoring target, and displaying, on the monitor, the work assignment pattern performed by the monitoring target in accordance with the adjusted resolution.

10. The work assignment status monitoring method according to claim 9, further comprising:

recording, as the plurality of work assignment histories, a plurality of pieces of information generated based on the result of the determination and related to the work assignment performed by the monitoring target; and deciding a normal state for the work assignment performed by the monitoring target from the plurality of recorded work assignment histories, wherein new information about the work assignment performed by the monitoring target generated based on the result of the determination, together with a result of a comparison between the new information generated based on the result of the determination and information about the work assignment in the normal state.

11. The work assignment status monitoring method according to claim 9, further comprising:

recording, as the plurality of work assignment histories, a plurality of pieces of information generated based on the result of the determination and related to the work assignment performed by the monitoring target;

deciding a normal state for the work assignment performed by the monitoring target from the plurality of recorded work assignment histories; and predicting information about a work assignment exceeding a range of the normal state among the plurality of pieces of the information about the work assignments performed by the monitoring target generated next based on a degree of deviation of the plurality of pieces of information about the work assignments performed by the monitoring target recorded as the plurality of recorded work assignment histories from information about the work assignment in the normal state, wherein a result of the prediction made is output.

12. A non-transitory computer readable medium storing a work assignment status monitoring program for causing a computer to execute:

acquisition processing of acquiring information about one or more work areas based on a result including a moving route of a predetermined mobile body captured by one or more sensors that each include a camera;

monitoring target detection processing of detecting the predetermined mobile body as a monitoring target and define a first monitoring target area where the monitoring target is positioned, the predetermined mobile body including an autonomously movable work robot that is configured to automatically perform the work assignment in accordance with one or more instructions;

detection processing of detecting the monitoring target by the one or more sensors;

determination processing of determining whether or not the monitoring target has performed the work assignment in the one or more work areas based on a frame of the first monitoring target area and a frame of the one or more work areas come to contact with each other;

information generation processing of generating information about the work assignment in the one or more work areas performed by the monitoring target based on a result of the determination made in the determination processing; and first output processing of outputting information about the work assignment performed by the monitoring target generated in the information generation processing including adjusting whether the work assignment in one of the one or more work areas and another work assignment in a second of the one or more work areas are displayed separately or are displayed as a single work assignment on a monitor based on adjusting a resolution of plane coordinates of a facility including the one or more work areas and in response to the monitoring target performing the work in the one or more work areas, wherein the frame of the first monitoring target area moves in accordance with movement of the monitoring target, and wherein the non-transitory computer readable medium storing the work assignment status monitoring program further causes the computer to:

execute performing processing of learning using a plurality of work assignment histories that are recorded, and deciding a predetermined state of the work assignment performed by the monitoring target in response to a result of the learning, the predetermined state being decided as a statistical model using a function shape and a network assignment pattern as a random variable, execute outputting processing of outputting the information about the work assignment in a highlighted manner in accordance with a degree of deviation from the information about the work assignment in the predetermined state, the highlighted manner including causing a corresponding flash display in response to a work time in the work area included in the newly performed work assignment pattern being longer than a work time in the work area included in the work assignment pattern in the predetermined state, execute defining, using the one or more sensors, the first monitoring target area based on a frame surrounding the monitoring target and that moves along in accordance with movement of the monitoring target, and execute displaying, on the monitor, the work assignment pattern performed by the monitoring target in accordance with the adjusted resolution.

13. The non-transitory computer readable medium storing the work assignment status monitoring program according to claim 12, further causing the computer to execute:

recording processing of recording, as the plurality of work assignment histories, a plurality of pieces of information generated in the information generation processing and related to the work assignment performed by the monitoring target;

normal state decision processing of deciding a normal state for the work assignment performed by the monitoring target from the plurality of work assignment histories recorded in the recording processing; and second output processing of outputting new information about the work assignment performed by the monitoring target generated in the information generation processing, together with a result of a comparison between the new information about the work assignment performed by the monitoring target generated in the information generation processing and the information about the work assignment in the normal state.

14. The non-transitory computer readable medium storing the work assignment status monitoring program according to claim 12, further causing the computer to execute:

recording processing of recording, as the plurality of work assignment histories, a plurality of pieces of information generated in the information generation processing and related to the work assignment performed by the monitoring target;

normal state decision processing of deciding a normal state for the work assignment performed by the monitoring target from the plurality of recorded work assignment histories recorded in the recording processing;

prediction processing of predicting information about a work assignment exceeding a range of the normal state among a plurality of pieces of the information about the work assignments performed by the monitoring target generated next in the information generation processing based on a degree of deviation of the plurality of pieces of information about the work assignments performed by the monitoring target recorded in the recording processing as the plurality of recorded work assignment histories from information about the work assignment in the normal state; and second output processing of outputting a result of the prediction made in the prediction processing.

\* \* \* \* \*